(12) United States Patent
Le Chevalier

(10) Patent No.: US 12,027,067 B1
(45) Date of Patent: *Jul. 2, 2024

(54) METHODS AND SYSTEMS FOR GLOBAL POSITIONING SYSTEM (GPS)-based PERSONALIZED LEARNING ACTIVITIES IN ONLINE EDUCATION PLATFORMS

(71) Applicant: Chegg, Inc., Santa Clara, CA (US)

(72) Inventor: Vincent Le Chevalier, Waikoloa, HI (US)

(73) Assignee: Chegg, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/298,285

(22) Filed: Apr. 10, 2023

Related U.S. Application Data

(63) Continuation of application No. 17/519,476, filed on Nov. 4, 2021, now Pat. No. 11,626,025.

(51) Int. Cl.
| | | |
|---|---|---|
| *G09B 5/00* | (2006.01) | |
| *G01S 19/51* | (2010.01) | |
| *G09B 5/04* | (2006.01) | |
| *G09B 5/06* | (2006.01) | |
| *G09B 7/00* | (2006.01) | |

(52) U.S. Cl.
CPC ............ *G09B 5/00* (2013.01); *G01S 19/51* (2013.01); *G09B 5/04* (2013.01); *G09B 5/065* (2013.01); *G09B 7/00* (2013.01)

(58) Field of Classification Search
CPC ... G09B 5/00; G09B 7/00; G09B 5/04; G09B 5/06; G09B 7/02; G09B 7/04; G09B 19/00

See application file for complete search history.

(56) References Cited

U.S. PATENT DOCUMENTS

2013/0275296 A1* 10/2013 Tietzen .................. G06Q 30/06
                                                                            705/39
2021/0097893 A1* 4/2021 Klappert ............. G06F 16/9024

* cited by examiner

*Primary Examiner* — Robert J Utama
(74) *Attorney, Agent, or Firm* — Morgan, Lewis & Bockius LLP; Manita Rawat

(57) ABSTRACT

In some embodiments, a method includes receiving an input including an educational objective for a user having an associated user device. The method includes sending a signal to receive Global Positioning System (GPS) transit data associated with a transit from a first location and a second location. The method further includes determining, based on a set of parameters and the GPS transit data, an effective transit time and selecting a set of educational content files that meet the educational objective. The method includes selecting, based on the effective transit time, a subset of the set of parameters and at least one characteristic associated with each educational content file, a subset of educational content files. The method further includes determining an order for the subset of educational content files to provide the subset of educational content files to the user device within the effective transit time to meet the educational objective.

15 Claims, 5 Drawing Sheets

| | Concept Description 401 | Concept Examples 402 | Concept Quiz 403 |
|---|---|---|---|
| Content Type | 1 x File 404 | 1 x File per Example N Examples 405 | 1 File per Question M Questions 406 |
| Content Properties | X Nb of Words 407 | Y(n) Nb of words per Examples (n) 408 | Z(m) Nb of words per Questions (m) T (m) Time for Answering a Question 409 |
| Text-to-Speech | S1 words/min Voice(s) Settings 410 | S2 words/min / Example Voice(s) Settings 411 | S3 words/min / Question Voice(s) Settings 412 |
| Time Correlation | T1 = X / S1  413 | T2 = N [Y(n) / S2]  414 | T3 = M [Z(m) / S3] + (T x M)  415 |
| Transit Time | superior or equal >= T1 + T2 + T3 416 | | |

FIG. 4

METHODS AND SYSTEMS FOR GLOBAL POSITIONING SYSTEM (GPS)-based PERSONALIZED LEARNING ACTIVITIES IN ONLINE EDUCATION PLATFORMS

CROSS-REFERENCE TO RELATED APPLICATION

This application is a continuation of U.S. patent application Ser. No. 17/519,476, filed Nov. 4, 2021, the entire contents of which are incorporated herein by reference.

TECHNICAL FIELD

Some embodiments described herein relate to online education platforms providing personalized learning activities. In particular, but not by way of limitation, some embodiments described herein relate to Global Positioning System (GPS)-based personalized learning activities in online education platforms.

BACKGROUND

People spend a considerable amount of time transiting from a first location to a second location for a range of purposes including the daily commute and an occasional road trip. Known methods that provide in-transit activities to users typically require the users to select, begin, and/or stop the activities (e.g., playing audio/video content) as their transit starts and concludes, and are not directed to educational activities. Accordingly, a need exists for an online education system that provides personalized learning activities to users based on global positioning system (GPS) data of a transit.

SUMMARY

In some embodiments, a method includes receiving, at a first processor, an input including an educational objective for a user having an associated user device. The method further includes sending a signal from the first processor to a second processor to receive Global Positioning System (GPS) transit data associated with a first location of the user and a second location of the user. The method further includes determining, based on a set of parameters and the GPS transit data, an effective transit time from the first location to the second location. The method includes selecting a set of educational content files that meet the educational objective based on a learning profile associated with the user and selecting a subset of educational content files based on the effective transit time, a subset of the set of parameters and at least one characteristic associated with each educational content file. The method includes determining an order for the subset of educational content files to provide the subset of educational content files to the user device within the effective transit time to meet the educational objective. The method further includes generating, based on the order, an ordered playlist of the subset of educational content files; and sending a signal to cause the ordered playlist to be presented to the user device.

BRIEF DESCRIPTION OF THE DRAWINGS

FIG. 4 shows an example ordered list of educational content files, according to some embodiments.

DETAILED DESCRIPTION

Embodiments described herein include methods and systems for automatically selecting, recommending, and providing learning concepts and activities, based on estimated time (or effective transit time) for a learner to travel from point A to point B. In some implementations, the effective transit time is calculated based on Global Positioning System (GPS) data from transit data services or the effective transit time received from the transit data services. This method provides a set of personalized learning activities (PLA) that can be continuously adjusted to the effective transit time, hence optimizing the delivery of structured personalized learning activities while the learner is on the move. The personalized learning activities can be structured for a single learner, such as in private cars, or to a group of learners, such as any forms of public transportations.

People spend a considerable amount of time transiting from a first location to a second location for a range of purposes, such as daily commuting to a place of education, work, etc., an occasional road trip through private, shared, or public transportation methods, and so on. A traveler (or a user) may seek to leverage their transit time by listening and/or watching, via the user's device, audio or video content published through a variety of media, such as multimedia audio/video data streaming, radio FM/AM broadcast, physical multimedia DVD and/or others. One or more embodiments described herein include methods and systems to provide or recommend a playlist with various multimedia content/activities based on the user's personalized educational objective(s) and the effective transit time, thus providing an improved, structured, and strategized learning experience for the user during the transit. In addition, the method and systems described herein provide personalized learning experience by factoring in the user's profile, preferences, and educational objects. The personalization feature can structure the learning of a new concept into several distinct steps, including, for example, a full description of the new concept, followed by a set of examples relating to the new concept, and ending with at least one quiz. One or more embodiments described herein correlate the personalization feature and the effective transit time consideration to provide a recommendation of various multimedia content/activities for an optimized learning experience during the time of the transit for the user toward the user's educational objective.

Figure 1:
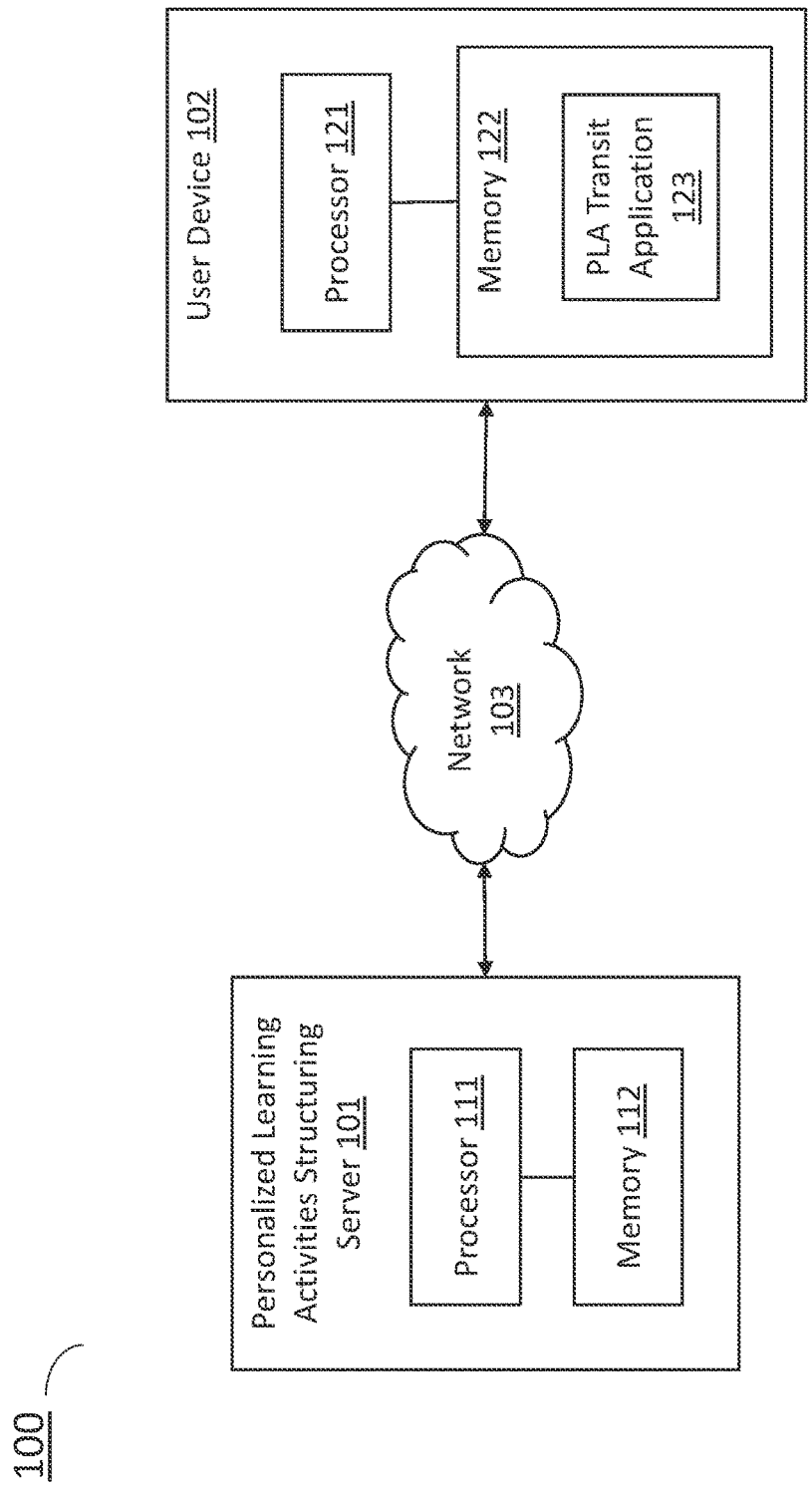
FIG. 1 is an example schematic diagram illustrating a personalized learning activities (PLA) structuring system, according to some embodiments.

FIG. 1 is an example schematic diagram illustrating a personalized learning activities (PLA) structuring system 100, according to some embodiments. As shown in FIG. 1, the PLA structuring system 100 includes a first compute device such as a PLA structuring server 101 and a second compute device such as a user device 102 configured to communicate with the PLA structuring server 101 via a network 103.

The PLA structuring server 101 can be a compute device (or multiple compute devices) having at least one processor 111 and at least one memory 112 operatively coupled to the at least one processor 111. In some instances, the PLA structuring server 101 can be any combination of a hardware-based module(s) (e.g., a field-programmable gate array (FPGA), an application specific integrated circuit (ASIC), a digital signal processor (DSP), a graphics processing unit (GPU)) and/or a software-based module(s) (computer code stored in memory 112 and/or executed at the processor 111) capable of performing one or more specific functions associated with that module. In some instances, the PLA structuring server 101 can be a server such as, for example, a web server, an application server, a proxy server, a telnet server, a file transfer protocol (FTP) server, a mail server, a list server, a collaboration server and/or the like. In some instances, the PLA structuring server 101 can be a personal computing device such as a desktop computer, a laptop computer, a personal digital assistant (PDA), a smart mobile telephone, a tablet personal computer (PC), and/or so forth. In some implementations, the PLA structuring server 101 can perform one or more specific functions through a cloud computing platform implemented at the PLA structuring server 101. The details of the PLA structuring server 100 are described with regards to FIG. 2.

The user device 102 can be a compute device having a processor 121 and a memory 122 operatively coupled to the processor 121. In some instances, the user device 102 can be a mobile device, a tablet personal computer, a personal computing device, a desktop computer, a laptop computer, an electronic reader, a video or audio system integrated with a vehicle, and/or the like. The user device 102 can be any combination of a hardware-based module(s) (e.g., a field-programmable gate array (FPGA), an application specific integrated circuit (ASIC), a digital signal processor (DSP)) and/or a software-based module(s) (computer code stored in memory 122 and/or executed at the processor 121) capable of performing one or more specific functions associated with that module.

The memory 122 can be, for example, a random-access memory (RAM) (e.g., a dynamic RAM, a static RAM), a flash memory, a removable memory, a hard drive, a database and/or so forth. In some implementations, the memory 122 can include (or store), for example, a database(s), process(es), application(s), virtual machine(s), and/or other software modules (stored and/or executing in hardware) and/or hardware modules configured to execute a Global Positioning System (GPS)-based PLA structuring process(es) as described with regards to FIG. 3. In such implementations, instructions for executing the GPS-based PLA structuring process(es) as described with regards to FIG. 2 and/or the associated methods can be stored within the memory 122 and executed at the processor 121. In some embodiments, the memory 122 of the user device 102 can store a PLA transit application 123 to be executed by the processor 121.

The processor 121 can be configured to, for example, write data into and read data from the memory 122, and execute the instructions stored within the memory 122. The processor 121 can also be configured to execute and/or control, for example, the operations of other components of the user device 102 (such as a network interface card, other peripheral processing components (not shown)). In some implementations, based on the instructions stored within the memory 122, the processor 121 can be configured to execute one or more steps of the GPS-based PLA structuring process(es) as described with regards to FIG. 3. In some implementations, the processor 121 and the processor 111 can be collectively configured to execute the GPS-based PLA structuring process(es) as described with regards to FIG. 3.

In some embodiments, the user device 102 can be configured with a user interface, e.g., a graphical user interface (e.g., the PLA transit application 123). The user device 102 can be an electronic device that can communicate with the PLA structuring server 101 via the user interface (e.g., a web browser, a mobile application, or an application on the compute device integrated with a vehicle that presents the user interface to a user).

In some implementations, the processor can execute the PLA transit application 123, which can include an embedded multimedia player to convert the streamed/downloaded data structure (i.e., educational content files) into voice/music/video content based on the structured concept learning activities (i.e., educational content files). The handshake mechanism between the PLA transit application 123 on the user device 102 and the PLA structuring server 101 can manage the flow of upcoming data stream and local memory cache available. In some implementations, the PLA transit application 123 run (executed) on the user device 102 can receive feedback from the user(s), via voice or touchscreen inputs for example. For example, the user can input responses to a quiz via the user interface of the PLA transit application 123, commands to modify or change the educational content files to be delivered (e.g., switch to a new concept, add more examples, no quiz), etc.

In some implementations, the PLA structuring server 101 can be configured to provide the user interface capabilities as well as the PLA structuring capabilities (or computational resources to recommend personalized learning activities based on a plurality of parameters including, for example, GPS data of transits and users' profiles) to the user device 102 via the network 103 (e.g., the user device 102 can act as a thin client). In some implementations, the PLA structuring capabilities can be implemented at the processor 121 and memory 122 of the user device 102 (e.g., the user device 102 can act as a thick client). In some implementations, the PLA structuring server 101 can be configured to provide the user interface capabilities to the user device 102 via the network 103. The PLA structuring server 101 can be communicatively coupled to additional computing devices (including processors and memories; not shown in FIG. 1), which provide the PLA structuring capabilities to the user device 102. In these implementations, the user device 102 can request (or call) the PLA structuring application (e.g., the PLA structuring 213 in FIG. 2, or instructions stored in the memory 112 and executed by the processor 111 and/or computing devices that provide the PLA structuring capabilities) through an Application Programming Interface (API), such as Representational state transfer (REST), GraphQL, Simple Object Access Protocol (SOAP), Remote Procedure Call (RPC), and/or the like. The PLA structuring application (e.g., the PLA structuring 213 in FIG. 2 or instructions stored in the memory 112 and executed by the processor 111 and/or computing devices that provide the PLA structuring capabilities), in some implementations, can be requested or called through directly managing requests according to the protocol (for instance HTTP, TCP, or RPC calls), or may be managed through a client library or a software development kit (SDK) installed on the user device 102.

In some implementations, the PLA structuring capabilities (or computational resources to recommend personalized learning activities based on a plurality of parameters including, for example, GPS data of transits and users' profiles) provided by the PLA structuring server 101 (or in some implementations, computing devices communicatively coupled to the server 101) can be accessed by the user device 102 over a network, intranet, internet, extranet, peer-to-peer connection, or other collection of networked computer systems. The computational resources may run on machines, virtual machines, containers, or other abstractions of computer hardware.

In some implementations, the PLA structuring server 101 can be configured to provide the PLA structuring application via a remote cloud computing server(s) (not shown). For example, the user device 102 can access the PLA structuring application via a user interface (e.g., a web browser) installed on the user device 102. The PLA structuring server 101 can be configured to store instructions of the PLA structuring application in the memory 112 and the PLA structuring application is executed by the processor 111. The PLA structuring application can communicate with a remote cloud computing server(s) (not shown) to perform analysis using the computational resources residing on the remote cloud computing server(s). The results of computation can be sent to the PLA structuring application hosted by the PLA structuring server 101 and presented to the user interface installed on the user device 102. In some implementations, the user device 102 can communicate with a remote cloud computing server(s) (not shown) to access the PLA structuring application (for user interface, submitting structuring request, receiving playlist results, and/or the like) as well as the computational recourses to perform the analysis to compute a playlist of educational content activities based on, for example, effective transit time.

Figure 2:
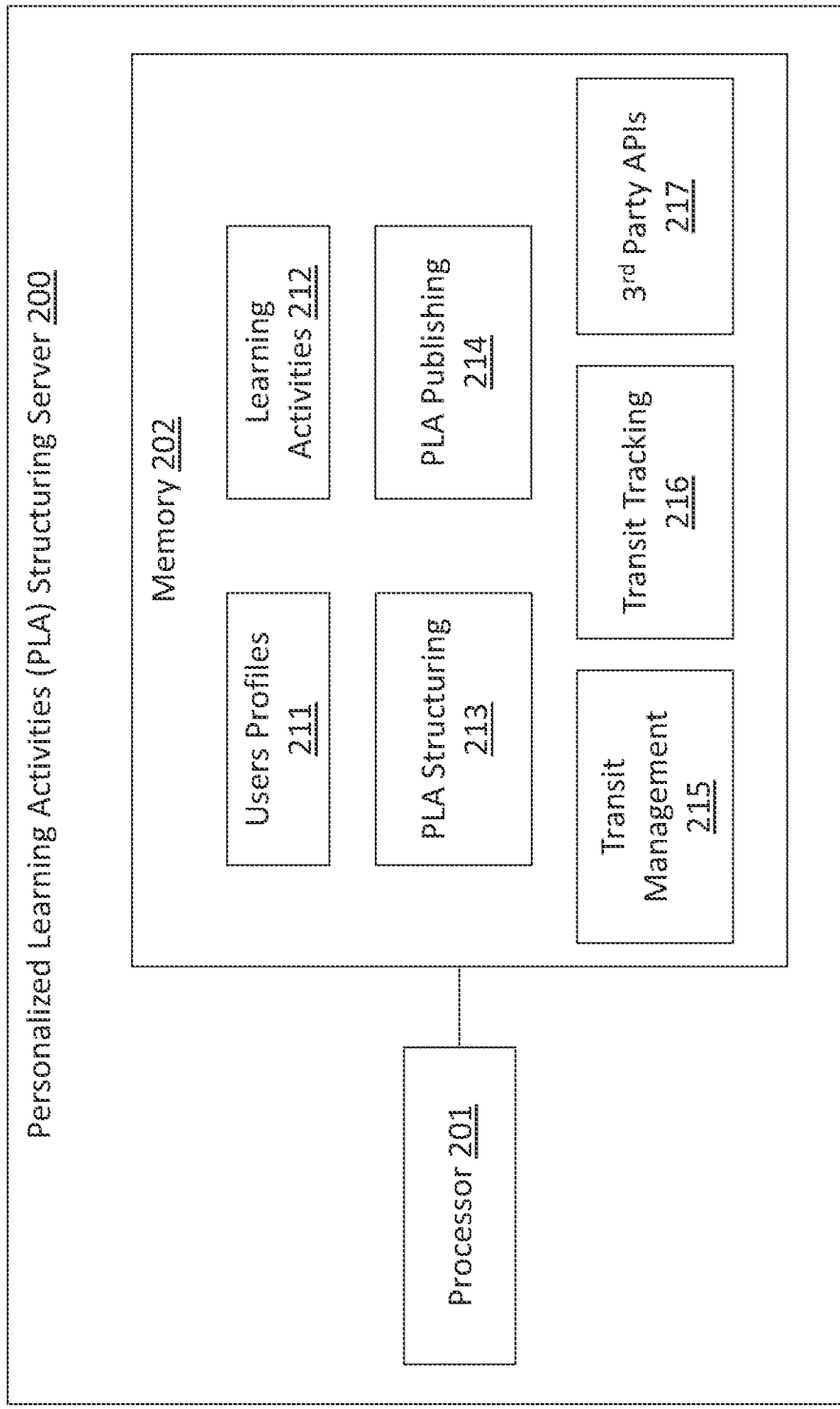
FIG. 2 is an example schematic diagram illustrating a PLA structuring server, according to some embodiments.

FIG. 2 is an example schematic diagram illustrating a PLA structuring server, according to some embodiments. The PLA structuring server 200 is functionally and physically similar to the PLA structuring server 101 described with regards to FIG. 1. In some embodiment, the PLA structuring server 200 includes a processor 201 and a memory 202 operatively coupled with the processor 201.

The processor 201 can be configured to, for example, write data into and read data from the memory 202, and execute the instructions stored within the memory 202. The processor 201 can also be configured to execute and/or control, for example, the operations of other components of the PLA structuring server 200 (such as a network interface card, other peripheral processing components (not shown)). In some implementations, based on the instructions stored within the memory 202, the processor 201 can be configured to execute one or more steps of the GPS-based PLA structuring process(es) as described with regards to FIG. 3.

The memory 202 can be, for example, a random-access memory (RAM) (e.g., a dynamic RAM, a static RAM), a flash memory, a removable memory, a hard drive, a database and/or so forth. In some implementations, the memory 202 can include (or store), for example, a database, process, application, virtual machine, and/or other software modules (stored and/or executing in hardware) and/or hardware modules configured to execute a Global Positioning System (GPS)-based PLA structuring process(es) as described with regards to FIG. 3. In such implementations, instructions for executing the GPS-based PLA structuring process(es) and/or the associated methods can be stored within the memory 202 and executed at the processor 201.

In some implementations, the memory 202 can store users profiles and preferences 211, learning activities 212, software code representing instructions to be executed by a processor (e.g., processor 201) and cause the processor to execute the PLA structuring module 213, the PLA publishing application module 214, the transit management module 215, the transit tracking module 216, and the third party APIs 217. In some implementations, these modules or software program modules 213-216 can include computer-executable instructions executable by one or more computers or other devices. Generally, software program modules include routines, programs, objects, components, data structures, etc. that perform particular tasks or implement particular abstract data types. Typically, the functionality of the program modules can be combined or distributed as desired in various embodiments.

User profiles and preferences 211 can include, for example, profile information input by the user and/or a learning profile of the user generated by the PLA structuring server 200. In some implementations, the PLA structuring server 200 can generate an on-going learning profile of the user (and accessible to the user via the user interface) based on learning services accessed on the user interface by the user, either as a student or a professional. The PLA structuring server 200 can update the learning profile of the user at users profiles and preferences 211 automatically, periodically, and/or in real-time as the user accesses learning contents and activities via the user interface. The PLA structuring server 200 can provide on-going recommendations of learning content and activities based on the learning profile of the user at users profiles and preferences 211 using machine learning and analytics algorithms.

Learning activities 212 can be or include, for example, educational content in a variety of subject matter, topics, concepts, and formats (e.g., images, audio, video, text, braille books for the visually impaired users, plain text, HTML, JSON, XML, and/or the like.) For example, the learning activities 212 can be content relating to textbooks, courses, jobs, and videos. The educational content can be deconstructed into a set of educational content files in a library of concepts, which can be accessed on-demand and consumed by degrees of proximity and/or complexity based on the user profiles and preferences 211. In some implementations, the PLA structuring server 200 can provide, recommend, or structure a playlist of educational content files from learning activities 212 and of a concept having multiple phases, providing a comprehensive experience to the learner in-transit. An example of such a structure of the playlist can include a description phase of the concept, followed by examples of the concept, and concluding by a quiz with multiple questions/answers relating to the concept. Other combinations of activities can be added or combined to form many different structures of playlists. In some implementations, the PLA structuring server 200 can generate one or more playlists of educational files (or learning activities from learning activities 212) for a single transit or multiple transits (e.g., a roundtrip, weekday morning commutes, weekday roundtrips, and/or the like.) For multiple transits, the PLA structuring server 200 generates playlist(s) of educational files based on the domain of concepts, subject matter proximity between concepts and/or domains, progressing phases of concepts and/or domains, complexities of concepts and/or domains. In other words, the PLA structuring server 200 can provide an automated system for structuring current and upcoming learning activities from learning activities 212 optimized for upcoming transits.

A method of processing content in the learning activities 212 of the PLA structuring server 202 including parsing the content in the learning activities 212 and assigning concepts to content items using a learned model is described in a related U.S. Patent Publication No. 2019/0385470, filed Jun. 19, 2018 titled "Time-Constrained Personalized Learning Activities in Online Education Platforms," the contents of which are incorporated herein in its entirety.

The memory 202 can store software code representing instructions of the transit management 215 and representing the third party APIs 217. The processor 201 can execute the instructions included in the transit management 215 to determine an effective transit time of a user from a first location to a second location based on data received in response to executing the transit tracking 216 code and/or data received from third party API services (e.g., TomTom® or MapQuest®) that collect real-time traffic information of a local area, a regional area, or worldwide. The processor 201 can determine the effective transit time of the user from the first location to the second location based on a set of parameters including, for example, a method of transit (e.g., private car as a driver, private car as a passenger, carpool transportation, taxi, public bus transportation, public train transportation, airplane, bicycle, walk, and/or the like), path(s) taken between the first location and the second location, starting day/time of transit, local weather and volume of traffic coupled with historical data, and/or the like. As real-time events such as accidents, road work and/or others get captured by the execution of the transit management 215 and/or the third party APIs 217, the processor can re-calculate or update the predicted effective transit time based on available data to show either a positive or negative deviation from the previously-predicted effective transit time. In addition, the processor 201 can execute the instructions included in the transit management 215 to collect or determine information on the quality of network coverage along the path of the user's transit to determine a set of checkpoints to be used by the PLA publishing 214 to optimize the delivery of the structured learning activities (or the set of educational files) to the user.

The memory 202 can store software code representing instructions of the PLA structuring 213. In some implementations, the processor 201 can execute the instructions of the PLA structuring 213 to manage a structuring phase 501 (discussed further with reference to FIG. 5), in which a set of educational content files that meet or substantially meet the educational objective based on the user's learning profile and/or preferences is selected. In some implementations, the set of educational content files meeting or substantially meeting the educational objective can be the instances where the subject matter included in the set of educational content files cover at least a pre-determined percentage (e.g., 80%) of subject matter required by a curriculum (or a textbook) or an educational entity. For example, the set of educational content files can be determined to meet or substantially meet the educational objective when the subject matter included in the set of educational content files include at least 80% of the subject matter required by an Ivy League university. In some implementations, the set of educational content files meeting or substantially meeting the educational objective can be the instances where the user improves the score of a test, provided by a testing organization or by the PLA structuring server 200, by a predetermined percentage (e.g., 20%). For example, if the user's educational objective is to increase their SAT score by 10%, the set of educational content files meet or substantially meet the educational objective when the user improves the SAT score by 10% within a pre-determined margin (e.g., between 8% to 15%). In some implementations, whether the set of educational content files meet or substantially the educational objective can be associated with a group of people. For example, if a user's educational objective is to pass a knowledge test to obtain a driver's license, the set of educational content files can be determined to meet or substantially meet the educational objective when 80% of people who studied the set of educational content files have passed the test. In some implementations, the PLA structuring server 200 can determine the standard of meeting or substantially meeting the educational objective using a machine learning algorithm. The processor 201 can then select a subset of educational content files from the set of educational content files based on the effective transit time such that the subset of educational content files can be delivered and consumed by the user within the effective transit time. Operation of PLA structuring 213 is discussed further in reference to FIG. 3.

The memory 202 can store software code representing instructions of the PLA publishing 214. In some implementations, the processor 201 can execute the instructions of the PLA publishing 214 to manage a delivery phase 502 (discussed with reference to FIG. 5), in which the structured learning activities (or the educational content files) are distributed over the available network(s) to the PLA transit application running on the user's device and/or to the computing device (or entertainment system) integrated with the vehicle. In addition, the processor 201 can manage handshake communications between the PLA structuring server 200 (or 101 in FIG. 1) and the user device (102 in FIG. 1). In some implementations, the processor 201, in response to executing the PLA publishing 214, can use a hybrid mode of content publishing including a combination of pre-loading of the educational content files and streaming of the data stream of the educational content files. In some examples, the streaming of structured learning concept activities (or the educational content files), assuming the files include voice/audio content only with no video content, uses a network bandwidth, for example, ranging from 96 kbps (normal network bandwidth) to 160 kps (high network bandwidth) up to 320 kbps (extreme high network bandwidth), based on the audio quality of the educational content files, for example. This level of network bandwidth can be within the range of cellular networks in most locations. In some instances, when the processor 201 pre-loads the content from at least segments of the educational files, the processor 201 can analyze the amount of local memory cache available to the PLA transit application running on the user device to anticipate possible network bandwidth issues. For example, for a normal network bandwidth of 96 kbps, the storage used to pre-load or stream the content on a user device is about 0.72 MB per minute. For a high network bandwidth of 160 kbps, the storage used to pre-load or stream the content on a user device is about 1.2 MB per minute. For an extreme high network bandwidth of 160 kbps, the storage used to pre-load or stream the content on a user device is about 2.4 MB per minute.

The memory 202 can store software code representing instructions of the transit tracking 216. In some implementations, the processor 201 can execute the transit tracking 216 to monitor and process data or feedback signals received from a set of sources including, for example, (1) the PLA transit application (e.g., the PLA transit application 123 run on the user device 102 in FIG. 1), (2) inputs and/or feedback received from the user via the user interface of the PLA transit application (e.g., the PLA transit application 123 run on the user device 102 in FIG. 1) while using the PLA transit application (e.g., the PLA transit application 123 run on the user device 102 in FIG. 1), and/or (3) the location of the user's method of transit (e.g., private car as a driver, private car as a passenger, carpool transportation, taxi, public bus transportation, public train transportation, airplane, bicycle, walk, and/or the like) within the transit path. In some implementations, the processor 201 can execute the transit tracking 216 to receive, from the PLA transit application run on the device, data or feedback signals including, for example, reports on the delivery of the data stream (e.g., size, speed, time, of the data stream sent) to the PLA transit application, reports from the PLA transit application on available memory, cache level, performance, network bandwidth and other quality of service issues that may impact the delivery of the educational content files by the PLA publishing 214. In some implementations, the processor 201 can execute the transit tracking 216 to receive inputs and/or feedback from the user via the user interface of the PLA transit application while using the PLA transit application on the user device. For example, the user can input data via voice/touchscreen inputs (e.g., responses to a quiz) during transit based on the educational content files delivered to the user device. In addition, the processor 201 can receive inputs from user when, for example, the user requests, during the transit, to modify or override the current playlist of the educational content files (e.g., a request to add more examples, switch to a new concept, skip quiz, and/or the like), which may trigger the PLA structuring 213 to re-constructure the current playlist with new concepts, learning activities, and/or educational content files.

Moreover, the processor 201 can execute the transit tracking 216 to receive or track the location of the user's method of transit (e.g., private car as a driver, private car as a passenger, carpool transportation, taxi, public bus transportation, public train transportation, airplane, bicycle, walk, and/or the like) on the transit path. The processor 201 can track the location of the user's method of transit to track the progress of the user within the playlist of the educational content files against the effective transit time available and can send the results back to the PLA structuring 213 to update the playlist. The location data of the user's method of transit can include, but not limited to, GPS, cellular towers, and/or LAN networks depending on the capabilities of the user device. For a connected vehicle (e.g., a smart car or WiFi®-enabled bus), location data can be captured from the integrated computing device of these vehicles and/or from the PLA transit application (e.g., the PLA transit application 123 in FIG. 1) when connected to one of the smart vehicle local area networks such as Bluetooth or WiFi®. In some implementations, only an approximate location is used to effectively track the delivery of educational content files over the transit.

In some implementations, the PLA structuring server 200 can be configured to provide user interface capabilities (e.g., an online education platform, or a PLA transit application 123 in FIG. 1) that allows the user device (user device 102 in FIG. 1) to request (or call) the PLA structuring 213 through an API. The user interface capabilities (e.g., an online education platform) can provide a suite of online learning services to all users, including, for example, but not limited to, accessing by reading, listening to, and watching contents of eTextbooks, academic material, reference articles, courses, training, large number of questions & answers, tests, accredited testing, as well as tutoring, reskilling, and upskilling services.

Figure 3:
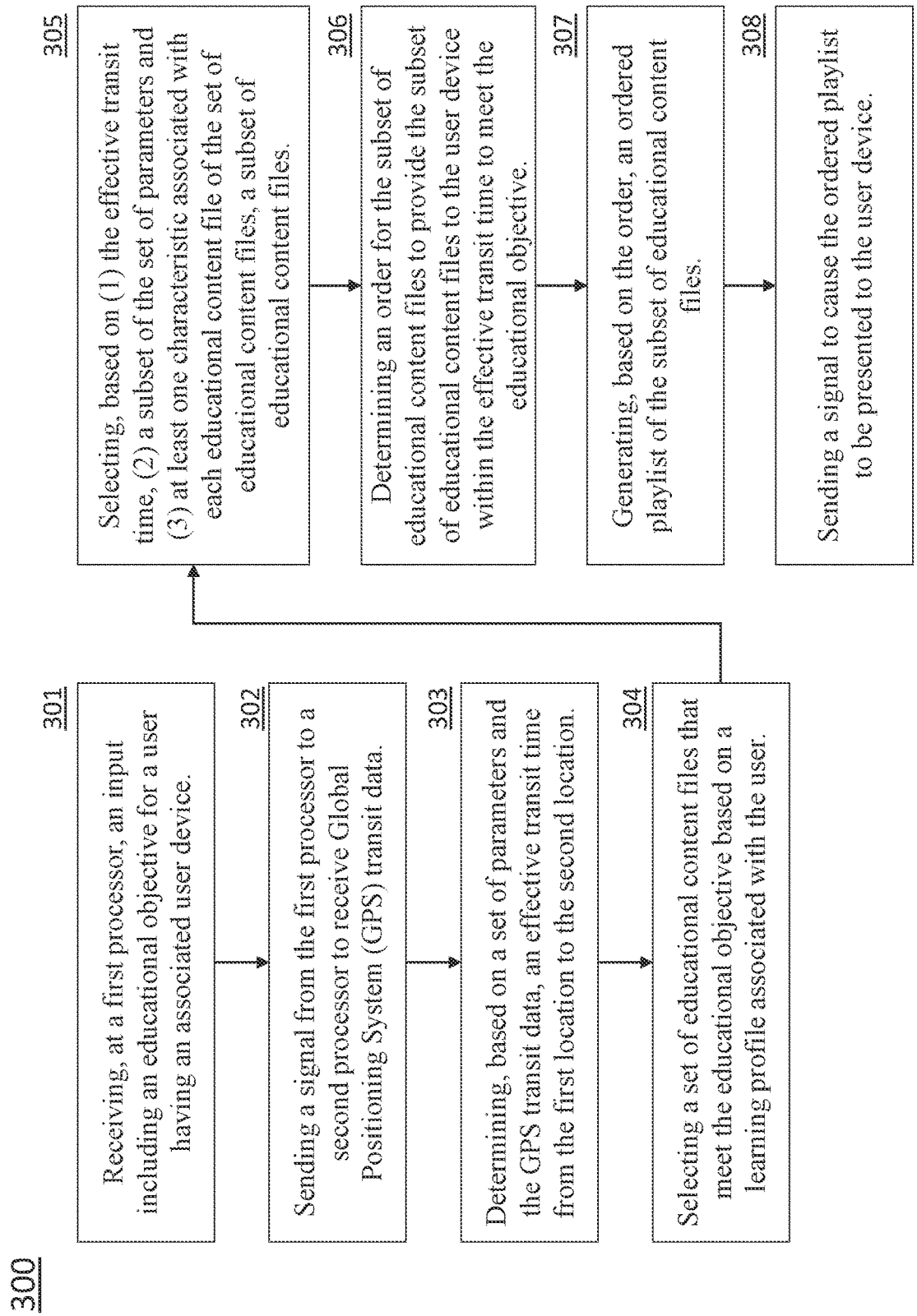
FIG. 3 illustrates a flow chart of an example PLA structuring process, according to some embodiments.

FIG. 3 illustrates a flow chart of an example PLA structuring process 300, according to some embodiments. This PLA structuring process 300 can be implemented at a processor and/or a memory of the PLA structuring system 100 (e.g., processor 111 or memory 112 at the PLA structuring server 101 as discussed with respect to FIG. 1, the processor 121 or memory 122 at the user device 102 as described with respect to FIG. 1, and/or the processor 201 or memory 202 at the PLA structuring server 200 discussed with respect to FIG. 2). The PLA structuring process 300 can include a structuring phase (including, for example, steps 303-307) in which a subset of educational content files is selected and ordered and a delivering phase (including, for example, step 308) in which the ordered playlist of the educational content files is distributed to the user's device. The structuring phase and the delivering phase of the PLA structuring process 300 are further discussed with reference to FIG. 5. In some implementations, the PLA structuring process 300 can also include a restructuring phase in which the order playlist of the educational content files are adjusted in response to, for example, a change in the effective transit time.

At 301, the example PLA structuring process 300 includes receiving, at a first processor, an input including an educational objective for a user having an associated user device. The input can be received from the user who learns the content from the educational content files, or from another user, such as, the user's professor. The educational objective can be, for example, Biology 101, macromolecules, quantum mechanics, home construction, and/or the like. In some implementations, the PLA structuring system 100 can determine or deduce the educational objective based on user's data (e.g., biographical information in user's profile, user's calendar entries, user's emails, and/or the like.)

In some implementations, the PLA structuring process 300 can provide learning activities or educational content files personalized to a single user or to a group of user sharing the same method(s) of transit. For example, methods of transportation such as buses, trains, taxis, shared cars, planes, ships are all examples of multiple users sharing one, or more, vehicles when transiting from a first location to a second location. In these implementations, the PLA structuring process 300 can aggregate all educational content files to provide personalized recommendations/playlists based on each user's profile and their individual educational objective within the predicted and effective transit time that they collectively experience. For the use case of providing personalized learning activities or educational content files to a group of users, as each user may have a different profile/preference and/or a different educational objective, the PLA structuring system 100 can select different learning activities (or different ordered playlist of the subset of educational content files as described with regards to step 30 in FIG. 3) for each user within the constraints of the effective transit time of the one or more method of transportation being used.

At 302, the example PLA structuring process includes sending a signal from the first processor to a second processor to receive Global Positioning System (GPS) transit data. The GPS transit data can be received via the execution of the transit management (e.g., 215 in FIG. 2) or from requests via third party APIs (e.g., 217 in FIG. 2). The GPS transit data is associated with a first location of the user and a second location of the user, and can include, in some implementations, real-time traffic and/or events such as accidents, road work and/or others. In some implementations, when the GPS transit data is received at the user device (e.g., 102 in FIG. 1), and the user device can send the GPS transit data to the PLA structuring server (101 in FIG. 1 or 200 in FIG. 2) and the PLA structuring server can determine an effective transit time based on the GPS transit data (as discussed with regards to 303 in FIG. 3). In these implementations, the first processor can be the processor of the PLA structuring server and the second processor can be the processor of the user device. In some implementations, when the user device acts as a thick client, the PLA structuring capabilities can be implemented at the user device. In these implementations, the user device can receive the GPS transit data and the processor at the user device can determine the effective transit time based on the GPS transit data. In such implementations, the first processor and the second processor are the same processors in the user device.

In some implementations, the GPS transit data is received at a compute device of a moving object/vehicle (e.g., a smart car, or an object moveable with the user (e.g., a GPS tracking device, a portable navigation device) from the first location to the second location), and the compute device of the moving object can send the GPS transit data to a processor at the user device (or a processor at the PLA structuring server) to determine the effective transit time based on the GPS transit data. In these implementations, the first processor is the processor at the user device or the processor at the PLA structuring server and the second processor is the compute device of the moving object.

At 303, the example PLA structuring process includes determining, based on a set of parameters, the GPS transit data, and an effective transit time from the first location to the second location. The set of parameters can include a method of transit and a route from the first location and the second location. For example, a method of transit can include private car as a driver, private car as a passenger, carpool transportation, taxi, public bus transportation, public train transportation, airplane, bicycle, walk, shared methods of transit can include buses, trains, taxis, shared cars, planes, ships, and/or the like. In addition, the set of parameters can include starting day/time of transit, local weather and volume of traffic coupled with historical data, and/or the like.

In some implementations, determining the effective transit time can be based on quality of network coverage at a set of checkpoints on the route from the first location to the second location. In some implementations, the PLA structuring server 200 can receive data on the quality of network coverage or connectivity at a set of pre-determined checkpoints on the route. In other implementations, the PLA structuring server 200 can check the quality of network coverage or connectivity periodically (time-wise, or distance-wise). In some implementations, when the quality of network coverage or connectivity reaches a high threshold, a medium threshold, or a low threshold, the PLA structuring system 100 can accordingly provide different educational content files or educational content files in different formats (e.g., video files when network coverage is high, audio files when network coverage is medium or low, and text-only files when network coverage is low.)

At 304, the example PLA structuring process includes selecting a set of educational content files that meet the educational objective based on a learning profile associated with the user. In some implementations, the example PLA structuring process 300 includes determining one or more concepts associated with the educational objective for example, using a machine learning model, based at least in part on a syllabus, course textbook, handouts, or other educational content associated with the educational objective. In some implementations, the example PLA structuring server 200 can search the learning activities 212 for content that matches the one or more concepts associated with the educational objective. Result of the search can return a set of content records of educational content files in the learning activities 212.

At 305, the example PLA structuring process includes selecting a subset of educational content files of the set of educational content files, based on (1) the effective transit time, (2) a subset of the set of parameters and (3) at least one characteristic associated with each educational content file of the set of educational content files. In some implementations, the subset of the set of parameters can include the method of transit, the network coverage or connectivity along the route from the first location to the second location (e.g., based on data received from a set of checkpoints along the route). For example, the PLA structuring process 300 can select a first subset of educational content files (e.g., in audio only format) when the method of transit is private car as the driver or bicycle, while the PLA structuring process 300 can select a second subset of educational content files (e.g., in both video and audio formats) when the method of transit is public bus transportation. The at least one characteristic associated with each educational content file can include, but not limited to, the format of the educational content file (e.g., audio, video, text-only), the number of words, the time it takes to deliver the content via speech or audio, the number of words per minute, the content category (e.g., concept description, concept examples, concept quiz, motivational speech, congratulations speech), the complexity level of the content included in that educational content file, and/or the like.

In selecting the subset of educational content files, in some implementations, the PLA structuring process can select educational content files from the set of educational content files based on the effective transit time and the time that the subset of educational content files can be played and consumed. In other words, the PLA structuring process 300 can select the educational content files such that the educational content files can be fully delivered and consumed within the effective transit time. The PLA structuring process 300 can include calculating the time that the subset of educational content files are played and consumed based on the number of words per minute associated with each educational content file from the set of educational content files.

In some implementations, the at least one characteristic of each educational content file can include a number of words per minute (wpm) and/or the total number of words associated with each educational content file from the set of educational content files. In some implementations, the PLA structuring system 100 can convert the content from each educational content file from the set of educational content files into speech (e.g., files in an audio format) based on the number of words in each educational content file. Based on the total number of words of each educational content file and the desired or designated speed of each educational content file (e.g., words per minute), the PLA structuring system 100 can determine the time it takes to deliver and play each educational content file. The PLA structuring system 100 can select the educational content files based on the time it takes to deliver and play each educational content file such that the subset of educational content files can be fully delivered and consumed within the effective transit time. In other words, the PLA structuring system 100 can determine the time it takes to deliver and play each educational content file by dividing the number of words in the content of the educational content file by the number of words per minute to use during the delivery. In some implementations, the PLA structuring system 100 can add additional time (e.g., pauses between sections of each educational content file, pauses between educational content files, pauses for the user to answer to questions in the quiz, and/or the like.)

In selecting the subset of educational content files, the PLA structuring system (e.g., 100 in FIG. 1) can select the subset of educational content files based on the time it takes to deliver/play the educational content files being less than or equal to the effective transit time. In some implementations, a particular educational content file may be encoded with different speech speeds (i.e., different value of words per minute) to provide multiple choices to the PLA structuring system when having to increase or decrease streaming time during a restructuring (or adjustment) phase. For example, in the restructuring phase, in response to the effective transit time being increased (e.g., road construction causing the arrival time of the transit to be delayed), the PLA structuring system can reduce the speech speed of a previous-selected educational content file or select additional educational content file(s) to be played during the increased effective transit time. For another example, depending on the quality of network coverage or connectivity, the PLA structuring system can select a different speech speed from a set of encoded speech speeds of the educational content file(s) to accommodate the different network coverages (e.g., faster wpm when network coverage is better, slower wpm when network coverage degrades).

At 306, the example PLA structuring process 300 includes determining an order for the subset of educational content files to provide the subset of educational content files to the user device within the effective transit time to meet the educational objective. FIG. 4 shows an example ordered list of educational content files by determining the subset of educational content files (and the order for the subset of educational content files) based on the effective transit time and the time it takes to deliver the subset of educational content files. Based on the example ordered list of educational content files 400 as shown in FIG. 4, the example PLA structuring process 300 can generate an ordered playlist (i.e., an ordered list of identifiers identifying each of the subset of educational content files) of the subset of educational content files to present to the user, which will be discussed further at step 307 and 308 of the example PLA structuring process 300. In this example, the subset of educational content files include files of different content types including concept description 401, followed by concept examples 402 and concept quiz 403. These content types can give the users/learners a diverse range of types of learning (e.g., concept description for passive learning, content example for active learning, and concept quiz to recall and reinforce concepts learnt) to help the users/learners master the content. In this example, the educational content file in the concept description category includes one file 404. In other examples, the educational content file(s) in concept description category can include more than one files. In this example, the educational content file(s) in the concept examples category includes a number of N files with each file containing one example 405. The educational content file(s) in the concept quiz category includes a number of M files with each file containing one question 406.

In some implementations, the example PLA structuring process 300 can determine the order of the subset of educational content files based on (1) the educational objective selected by the user, (2) the selected subset of educational content files from step 305 discussed above with regards to FIG. 3 and the set of characteristics associated with each selected educational content file, (3) the effective transit time, and/or (4) the time it takes to deliver the selected subset of educational content files. In some instances, the PLA structuring server 200 can include one or more educational content files that are in the category of concept description 401 first, followed by one or more educational content files that are concept examples 402, and followed by one or more educational content files that are concept quiz 403. In the example shown in FIG. 4, the order of the subset of educational content files includes one educational content file 404 that relates to concept description, followed by N educational content files 405 that include N concept examples, and followed by M educational content files 406 that include M concept questions. In some implementations, the PLA structuring server 200 can continue to automatically adjust the number of concept examples, the number of concept questions, and/or the number of educational content files that relate to concept description, in real time as the effective transit time may change. Similar to step 305 discussed above with regards to FIG. 3, the example PLA structuring process 300 can determine the order of the subset of educational content files based on the at least one characteristic associated with each educational content file, which can include, but not limited to, the format of the educational content file (e.g., audio, video, text-only), the number of words, the time it takes to deliver the content via speech or audio, the number of words per minute, the content category (e.g., concept description, concept examples, concept quiz, motivational speech, congratulations speech), the complexity level of the content included in that educational content file (e.g., deliver easier concept description/concept examples/concept questions first followed by more difficult concept description/concept examples/concept questions, and/or the like.

Each educational content file can have a set of characteristics (also referred to as content properties, as shown in the table of FIG. 4). In this example, the characteristic of the educational content file in the concept description category includes the number of words X 407. The characteristic of the educational content file(s) in the concept examples category includes a number of words of each example Y(n) 408. The characteristic of the educational content file(s) in the concept quiz category includes a number of words of each question Z(m) and time used to pause for the user to answer the question T(m) 409. The PLA structuring system 100 can determine the speed of each educational content file, that is the words-per-minute voice settings, S1, S2, S3 for the educational content files in each content type/category 410, 411, and 412, respectively. Based on the information in 404-412, the PLA structuring system 100 can determine the time it takes to deliver and play each educational content file. For example, the time it takes to deliver the educational content file(s) in the concept description category (i.e., T1) is the number of words (X) divided by the words per minute S1 413 (in other words, T1=X/S1). The time it takes to deliver the educational content file(s) in the concept example category 414 (i.e., T2) is the number of examples (N) multiplying the time it takes to deliver each example, which can be obtained by dividing the number of words for each example Y(n) by the words per minute S2 (in other words, T2=N*(Y(n)/S2)). The time it takes to deliver the educational content file(s) in the concept quiz category 415 (i.e., T3) is the number of questions (M) multiplying the total time it takes to deliver each question and pause for the answer. For each question, the total time it takes to deliver the question and pause for the answer can be obtained by dividing the number of words for each question Z(m) by the number of words per minute S3 and adding the time to pause for the user to answer the question T(m). In other words, T3=M*(Z(m)/S3+T(m)). The PLA structuring system 100 can then aggregate this time for all questions to determine the total time it takes to deliver and pause for all questions T3 415. In some implementations, the PLA structuring system 100 can ensure the total time it takes to deliver and pause the subset of educational content files (T1+T2+T3) is less than or equal to the effective transit time 416.

Returning to FIG. 3, at 307, the example PLA structuring process 300 includes generating, based on the order, an ordered playlist of the subset of educational content files. In some implementations, the PLA structuring system 100 can generate the ordered playlist of the subset of educational content files based on templates stored in a memory. In some implementations, the templates (or the structure of the ordered list of the subset of educational content files 400 as shown in FIG. 4) used by the PLA structuring process 300 can have a different number of sections of content categories or different structures of content categories. In the example illustrated in FIG. 4, the template includes educational content files in concept description 401, concept examples 402, and concept quiz 403. In other examples, the template can include, but not limited to, concept examples only and no concept quiz, concept quiz only and no concept examples, concept description only, concept quiz first followed by concept description, and/or the like. In some implementations, the templates can include multimedia files, which may include one or more of audio files, video files, and/or text files. For example, an audio or a video file including a musical introduction, a progress announcement, a motivational note or a congratulatory note may be inserted at the beginning, at the end or at any point of the ordered list of the subset of educational content files.

At 308, the example PLA structuring process 300 includes sending a signal to cause the ordered playlist to be presented to the user device. In some implementations, the ordered playlist includes an ordered list of identifiers and each identifier identifies an educational content file from the subset of educational content files. Each educational content file can be associated with metadata having information relating to the set of characteristics (e.g., the format of the educational content file (e.g., audio, video, text-only), the number of words, the time it takes to deliver the content via speech or audio, the number of words per minute, the content category (e.g., concept description, concept examples, concept quiz, motivational speech, congratulations speech), the complexity level of the content included in that educational content file, and/or the like.) Each educational content file also includes data (i.e., the educational content) that are delivered/played to the user.

In some implementations, the PLA structuring process 300 can also include a restructuring phase in which the order playlist of the educational content files are adjusted in response to, for example, a change in the effective transit time. In some implementations, the example PLA structuring process 300 can include receiving adjusted GPS transit data in substantially real-time when the user device is on route from the first location to the second location, and determining, based on the adjusted GPS transit data and the set of parameters, an adjusted effective transit time. Based on the adjusted effective transit time and characteristics of the educational content files (e.g., a period of time within which an educational content file can be delivered or consumed), the example PLA structuring process 300 can include adjusting the subset of educational content files to determine an adjusted subset of educational content files from the set of educational content files in the restructuring phase. The example PLA structuring process 300 can include generating an adjusted ordered playlist of the adjusted subset of educational content files and sending a second signal to cause the adjusted ordered playlist to be presented to the user device. In some implementations, the adjusted ordered playlist of the adjusted subset of educational content files can include a last-played educational content file that ends substantially when a trip from the first location to the second location ends.

For example, when the adjusted effective transit time is greater or less than the effective transit time, the PLA structuring system 100 can add or remove educational content files (e.g., the number of files on the concept description category (e.g., 401 in FIG. 4), the number of examples in the concept examples category (e.g., 402 in FIG. 4), the number of questions in the concept quiz category (e.g., 403 in FIG. 4)) from the subset of educational content files, respectively.

For another example, the example PLA structuring process 300 can determine the adjusted subset of educational content files by adjusting a word-per-minute value for playback by the user device of at least one educational content file from the first subset of educational content files. In other words, at least one educational content file from the adjusted subset of educational content files can be played at a speed (accelerating or delaying) different from at least one educational content file from the subset of educational content files such that the adjusted subset of educational content files can be delivered and consumed within the effective transit time or the adjusted effective transit time. In these implementations, by adjusting the value of the words per minute (wpm) and/or selecting virtual speakers with different wpm values, the PLA structuring system 100 can adjust the time it takes to deliver any content within the subset of educational content files without necessarily having to add or remove content within the subset.

For example, Table 1 lists example average speech rates for different activities.

| Presentations | Between 100-150 wpm for a comfortable pace |
|---|---|
| Conversational | Between 120-150 wpm |
| Audiobooks | Between 150-160 wpm, which is the upper rang that people comfortably hear and vocalize words |
| Radio hosts & Podcasters | Between 150-160 wpm |
| Auctioneers | Can speak at about 250 wpm |
| Commentators | Between 250-400 wpm |

In some instances, when the speaking pace is about 130 words per minute, the text-to-speech engine of the PLA structuring system 100 can finish reading an A4 page (font: Calibri, font size 11) in about 4 minutes and 51 seconds.

In some implementations, the example PLA structuring process 300 can include receiving a user input from the user device in response to an educational content file from the subset of educational content files and determine the adjusted subset of educational content files in response to the user input. In some implementations, the PLA structuring system 100 can receive inputs and/or feedback from the user via the user interface of the PLA transit application while using the PLA transit application on the user device. For example, the user can input data via voice/touchscreen inputs (e.g., responses to a quiz) during transit based on the educational content files delivered to the user device. In addition, the PLA structuring system 100 can receive inputs from user when, for example, the user requests, during the transit, to modify or override the current playlist of the educational content files (e.g., a request to add more examples, switch to a new concept, skip quiz, and/or the like), which may trigger the PLA structuring 213 to re-construct the current playlist with new concepts, learning activities, and/or educational content files.

In some implementations, determining the adjusted subset of educational content files can include dividing an educational content file from the subset of educational content files into a first divided educational content file and a second divided educational content file to present the adjusted subset of educational content within the adjusted effective transit time such that the adjusted subset of educational content files includes only the first divided educational content file and not the second divided educational content file. In other words, the example PLA structuring process 300 can include breaking up an educational content file into portions to fit the adjusted subset of educational content files within the adjusted effective time.

In some implementations, determining the adjusted subset of educational content files can be based on the quality of network coverage or connectivity based on data received from a set of checkpoints along the route from the first location to the second location. For example, when the quality of network coverage or connectivity changes to a high threshold, a medium threshold, or a low threshold, the PLA structuring system 100 can accordingly adjust educational content files or change to educational content files with different formats (e.g., video files when network coverage is high, audio files when network coverage is medium or low, and text-only files when network coverage is low.)

Figure 5:
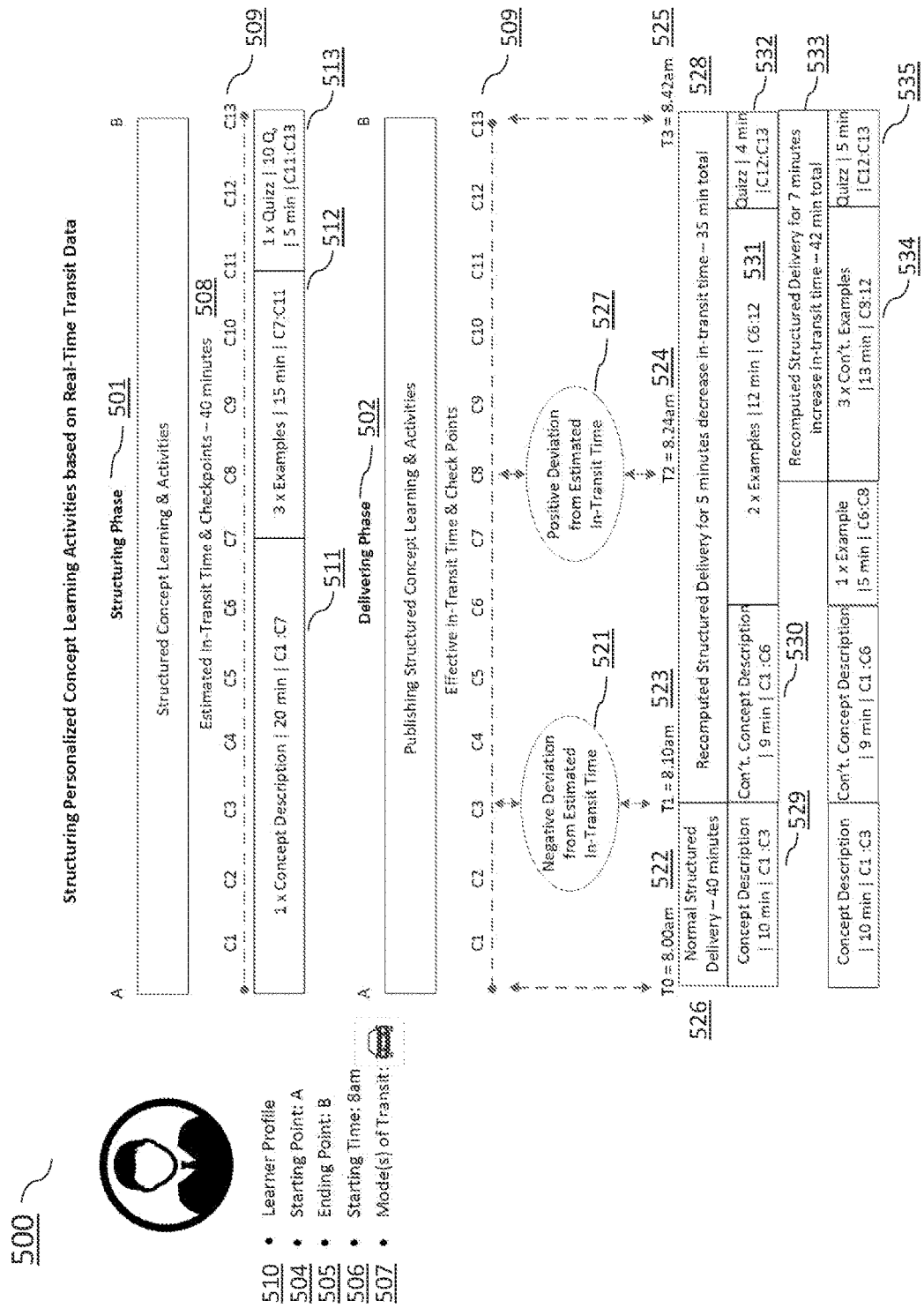
FIG. 5 shows an example use case of the PLA structuring process, according to some embodiments.

FIG. 5 shows an example use case of the PLA structuring process, according to some embodiments. As an example to the PLA structuring process 300 discussed in the flow chart in FIG. 3, FIG. 5 shows the PLA structuring process 500 for a single user showing a time line from left to right (e.g., the time line from C1 to C13 as shown as 509 in FIG. 5).

In some implementations, the example PLA structuring process 500 includes a structuring phase 501 followed by a delivering phase 502. The user can input an optional starting point A 504 (or a first location), an ending point B 505 (or a second location), a starting time for the transit 506, a method of transit 507, via a user interface of the PLA transit application on the user device, which can relate to an upcoming transit event (e.g., daily commute to work, a road trip, etc.). In some implementations, the PLA structuring server 200 (or the user device) can automatically determine the starting point A or the first location of the user, and thus the user does not need to input manually. Based on the analysis of the historic and/or real-time GPS data, the PLA structuring system 100 can calculate an effective transit time of 40 minutes 508 and determine a set of 13 network-capable checkpoints 509 located at frequent intervals to capture the user's location, learning progress along the transit path, and/or check network coverage along the transit path.

Based upon the effective transit time 508 and checkpoint availabilities 509, the PLA structuring process 500 can select a personalized concept to be learned by the user based on, for example, the user's learner profile 510 and then structure that personalized concept with its associated content and activities (or the set of educational content files) into multimedia file(s) to be delivered and/or streamed within the effective transit time. The set of educational content files can be structured into three concept categories including concept description 511, concept examples 512, and concept quiz 513. Each concept category can include one or more educational content files with streaming delivery time mapped against predetermined checkpoints 509 to track the status of the streaming content against the effective transit time and real-time location based on the GPS data.

In this example, the first concept category of "Concept Description" file can take about 20 minutes to get fully streamed and gets mapped to checkpoints C1 through C7 based on the effective transit time 511. Similarly, the second concept category of "Concept Examples" 512 includes 3 files, which can take about 15 minutes to get fully streamed and can be mapped to checkpoints C7 through C11. The third concept category of "Concept Quiz" (including 10 questions) 513 can take about 5 minutes to get fully streamed and can be mapped to checkpoints C11 to C13.

When building or selecting the subset of educational content files, the PLA structuring system 100 can select the subset of educational content files based on the time it takes to deliver the files in the first concept category 511, the second concept category 512, and the third concept category collectively being less than or equal to the effective transit time. In this example, the subset of educational content files (511-513) can take 40 minutes to be fully streamed with an estimated effective transit time of 40 minutes. In some implementations, a particular educational content file may be encoded at different words per minute to provide multiple choices to the PLA structuring system 100 when having to increase or decrease streaming time during a restructuration (or adjustment) phase.

The delivering phase 502 relates to the delivery and adjustment of the personalized structured learning concept activities (or the subset of educational content files) to the user during its effective transit. Although the subset of educational content files is selected based on the effective transit time during the structuring phase 501, the effective transit time can change/vary based on real-time events (e.g., traffic, road work, and/or the like), thus providing data for the dynamic restructuring (or adjusting) of the subset of educational content files during the effective transit.

In some instances, the variations in effective transit time can be a positive deviation when the adjusted effective transit time is predicted to be longer than the (initial) effective transit time. The variations can also be a negative deviation when the adjusted effective transit time is predicted to be shorter than the (initial) effective transit time.

When there is a negative deviation in the effective transit time 521, for example, the educational content files can start getting streamed at T0=8.00 am 522 and follows the effective transit time 526 until the C3 checkpoint is reached at T1=8.10 am 523. After 10 minutes of transit, the PLA structuring system 100 can receive new data (e.g., GPS data), which indicates that a deviation from the (initial) effective transit time is predicted. In this example, the deviation is negative 521 and it is predicted to take 5 minutes less 528 than the (initial) effective transit time determined during the structuring phase 501 to reach the second location (Point B) for a new total adjusted effective transit time of 35 minutes. Based on the adjusted effective transit time, the PLA structuring system 100 can adjust or reconstruct the playlist of the subset of educational content files to be streamed from within 40 minutes to 35 minutes. In this example, the initial 10 minutes of the first concept category of concept description 529 have been streamed, and the remaining of the initial 20 minutes concept description gets streamed a little bit faster by using a faster speech delivery rate in 9 minutes (i.e., more words per minute) 530. The initial 15 minutes of the second concept category of concept examples are shortened by 3 minutes to 12 minutes following the removal of one of the three examples 531. Finally, the third concept category of concept quiz is shortened by 1 minute to 4 minutes by removing 2 questions from the initial set of 10 questions 532.

When there is a positive deviation in the effective transit time 527 recorded at time T2 8.24 am 524, the second adjusted effective transit time now adds 7 more minutes to the first adjusted effective transit time of 35 minutes, bringing the new total second adjusted effective transit time to 42 minutes 533. Based on the second adjusted effective transit time, the PLA structuring system 100 can adjust or restructure again the subset of educational content files to be streamed from 35 minutes to 42 overall based on remaining transit time. In this example, the 7 minutes remaining of streaming concept examples get increased to 13 minutes by the addition of one, or more, examples 534. Finally, the concept quiz gets two additional questions to be streamed within 5 minutes 535.

In some implementations, the PLA structuring system 100 can structure sets of educational content files for a single user or a group of users transiting via one or more methods of transportation. For example, the PLA structuring system 100 can structure individual sets of educational content files for each user from a group of users sharing the same transit via the same method of transportation (e.g., shared taxi, or driverless taxi). In some implementations, the PLA structuring system 100 can structure sets of educational content files for a group of learners for the same educational objective and determine playlists of educational content files based on different effect transit time and different methods of transportation and restructure it dynamically based on the positive or negative deviations of the effective transit time which may occur during each phase of transit. For example, a group of users (e.g., a class of students) shares the same transit (e.g., classroom on wheels, or field trip on a bus) and the same educational objective (e.g., Biology 101). The PLA structuring system 100 can create different sets of educational content files for each user from the group of users.

In some implementations, the PLA structuring system 100 can change the transit for the user based on the selected educational content files. For example, when the PLA structuring system 100 determines that an extra 5 minutes of time is needed to play the educational content file(s) to meet or substantially meet the educational objective, the PLA structuring system 100 can send instructions to the navigation system of the user device to change the route (e.g., add a detour) of the transit such that the educational content file(s) can be played. The user, via the user device, can customize this feature and a plurality of other features of the PLA structuring system 100.

The PLA structuring system 100 described herein improves the personalized education learning field by automatically selecting, recommending, and providing learning concepts and activities, based on estimated time (or effective transit time) for a learner to travel from point A to point B. The PLA structuring system 100 can provide or predict the travel time (or the effective transit time) automatically and more accurately compared with how the learner estimates travel time mentally. The PLA structuring system 100 can adjust the effective transit time based on real-time traffic or road work further away from the learner's current location and along the transit. In addition, a learner cannot adjust the personalized learning activities when driving, while the PLA structuring system 100 can automatically provide the learner/driver real-time adjustments of the personalized learning activities.

In addition, the PLA structuring system 100 described herein can automatically and quickly determine the total number of words in each educational content file from multiple educational content files and determine, based on the effective transit time, the playback speed (or word per minute) of each educational content file. These technological solutions present significant and superior improvements compared with mental calculations and manual adjustments by the learner.

As used herein, the singular forms "a," "an" and "the" include plural referents unless the context clearly dictates otherwise. Thus, for example, the term "an educational content file" is intended to mean a single educational content file or multiple educational content files with similar functionalities. For another example, the term "an ordered playlist" is intended to mean a single ordered playlist or multiple ordered playlists.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be examples and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a compute device including a computer can be embodied in any of a number of forms, such as a rack-mounted computer, a desktop computer, a laptop computer, netbook computer, or a tablet computer. Additionally, a computer can be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

The invention claimed is:

1. A method, comprising
receiving, at a first processor, an input including an educational objective for a user having an associated user device;
sending a signal from the first processor to a second processor to receive Global Positioning System (GPS) transit data, the GPS transit data associated with a first location of the user and a second location of the user;
determining, based on a plurality of parameters and the GPS transit data, a first effective transit time from the first location of the user to the second location of the user, the plurality of parameters including a method of transit and a route from the first location and the second location;
selecting a plurality of educational content files that meet the educational objective based on a learning profile associated with the user;
selecting, based on (1) the effective transit time, (2) a first subset of the plurality of parameters and (3) at least one characteristic associated with each educational content file of the plurality of educational content files, a first subset of educational content files of the plurality of educational content files;
determining an order for the first subset of educational content files to provide the first subset of educational content files to the user device within the first effective transit time to meet the educational objective;
generating, based on the order, an ordered playlist of the first subset of educational content files;
sending a first signal to cause the ordered playlist to be presented to the user;
receiving adjusted GPS transit data in substantially real-time when the associated user device is on route from the first location to the second location;
determining, based on the adjusted GPS transit data and the plurality of parameters, a second effective transit time;
adjusting the first subset of educational content files based on the second effective transit time and at least one characteristic associated with at least one educational content file from the plurality of educational content files to determine a second subset of educational content files from the plurality of educational content files;
generating an adjusted ordered playlist of the second subset of educational content files; and
sending a second signal to cause the adjusted ordered playlist to be presented to the user device.

2. The method of claim 1, wherein the first processor is included in a server.

3. The method of claim 1, wherein:
the first processor is included in the user device; and
the second processor is included in an object moveable with the user from the first location to the second location.

4. The method of claim 1, wherein the second processor is included in user device.

5. The method of claim 1, wherein the determining the effective transit time includes determining based on quality of network coverage at a set of checkpoints on the route from the first location to the second location.

6. The method of claim 1, wherein the at least one characteristic includes a number of words per minute associated with each educational content file from the plurality of educational content files.

7. The method of claim 1, wherein the adjusting the first subset of educational content files to determine the second subset of educational content files includes adjusting a word per minute for playback by the user device of at least one educational content file from the first subset of educational content files.

8. The method of claim 1, further comprising:
receiving a user input from the user device in response to an educational content file from the first subset of educational content files; and
adjusting the first subset of educational content files in response to the user input.

9. A method, comprising:
sending a signal to receive Global Positioning System (GPS) transit data associated with a user device, the GPS transit data associated with a first location and a second location;
determining, based on a plurality of parameters and the GPS transit data, a first effective transit time to transit from the first location to the second location, the plurality of parameters including a method of transit;
selecting a plurality of educational content files that meet an educational objective and based on a learning profile associated with a user;
selecting, based on (1) the first effective transit time, (2) a first subset of the plurality of parameters and (3) at least one characteristic associated with each educational content file of the plurality of educational content files, a first subset of educational content files of the plurality of educational content files;
generating an ordered playlist of the first subset of educational content files to provide the first subset of educational content files to the user device within the first effective transit time to meet the educational objective;
receiving adjusted GPS transit data when the user device is on route from the first location to the second location;
determining, based on the adjusted GPS transit data and the plurality of parameters, a second effective transit time;
adjusting the first subset of educational content files based on the second effective transit time and the at least one characteristic associated with at least one educational content file from the plurality of educational content files to determine a second subset of educational content files from the plurality of educational content files;
generating an adjusted ordered playlist of the second subset of educational content files; and
sending a signal to cause the adjusted ordered playlist to be presented to the user device;
receiving a user input from the user device in response to an educational content file from the first subset of educational content files,
the adjusting the first subset of educational content files is in response to the user input.

10. The method of claim 9, wherein the determining the first effective transit time includes determining based on a quality of network coverage at a set of checkpoints on the route from the first location to the second location.

11. The method of claim 9, wherein the at least one characteristic include a number of words per minute associated with each educational content file from the plurality of educational content files.

12. The method of claim 9, wherein the adjusting the first subset of educational content files to determine the second subset of educational content files includes adjusting a word per minute for playback by the user device of at least one educational content file from the first subset of educational content files.

13. The method of claim 9, wherein:
the adjusted ordered playlist of the second subset of educational content files includes a last-played educational content file;
the last-played educational content file ends substantially when a trip from the first location to the second location ends.

14. The method of claim 9, wherein the adjusting the first subset of education content files includes dividing an educational content file from the first subset of education content files into a first divided educational content file and a second divided educational content file to present the second subset of educational content within the second effective transit time, the second subset of educational content files including the first divided educational content file and not including the second divided educational content file.

15. A non-transitory processor-readable medium storing code representing instructions to be executed by a processor, the code comprising code to cause the processor to:
send a signal to receive Global Positioning System (GPS) transit data associated with a user device, the GPS transit data associated with a first location and a second location;
determine, based on a plurality of parameters and the GPS transit data, a first effective transit time to transit from the first location to the second location, the plurality of parameters including a method of transit;
select a plurality of educational content files that meet an educational objective and based on a learning profile associated with a user;
select, based on (1) the first effective transit time, (2) a first subset of the plurality of parameters and (3) at least one characteristic associated with each educational content file from the plurality of educational content files, a first subset of educational content files from the plurality of educational content files;
generate an ordered playlist of the first subset of educational content files to provide the first subset of educational content files to the user device within the first effective transit time to achieve the educational objective;
receive adjusted GPS transit data when the user device is on route from the first location to the second location;
determine, based on the adjusted GPS transit data and the plurality of parameters, a second effective transit time;
adjust the first subset of educational content files based on the second effective transit time and at least one characteristic associated with at least one educational content file from the plurality of educational content files to determine a second subset of educational content files from the plurality of educational content files, an educational content file from the second subset of educational content files including same content played at a speed different from an educational content file from the first subset of educational content files;

generate an adjusted ordered playlist of the second subset of educational content files; and send a signal to cause the adjusted ordered playlist to be presented to the user device.

\* \* \* \* \*